Nov. 14, 1950  W. P. CRAWLEY  2,529,541
KNITTED STRUCTURE AND METHOD OF
PRODUCING SAID STRUCTURE
Filed Nov. 5, 1946
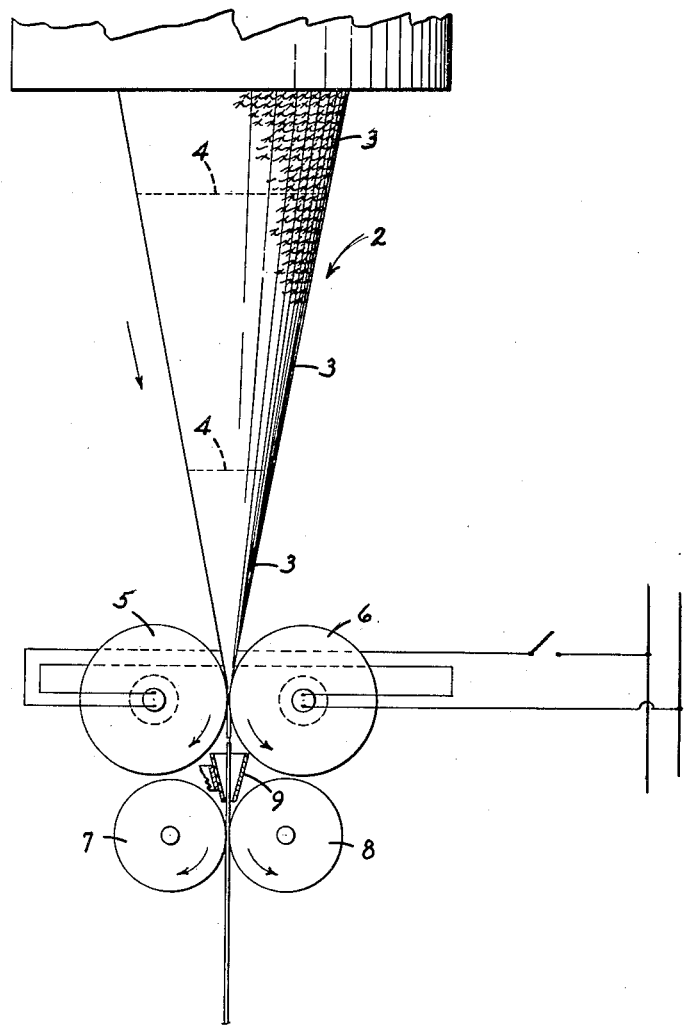
INVENTOR.
WILLIAM P. CRAWLEY
BY
Thomas R. O'Malley Patented Nov. 14, 1950

2,529,541

UNITED STATES PATENT OFFICE 2,529,541

KNITTED STRUCTURE AND METHOD OF PRODUCING SAID STRUCTURE

William P. Crawley, Chester, Pa., assignor to American Viscose Corporation, Wilmington, Del., a corporation of Delaware Application November 5, 1946, Serial No. 707,793

4 Claims. (Cl. 66—172)

This invention relates to the manufacture of knitted structures of the type commonly referred to as string goods.

In the manufacture of string goods, it is customary to knit a plurality of articles in the form of a continuous structure in which the adjacent edges of the individual articles are connected by a drawstring or the like which is knitted integrally with the structure, the knitted articles being separated after fabrication of the continuous structure by removal of the drawstring.

It has been proposed previously to join the individual knitted articles, during knitting of the continuous structure, by means of yarns comprising thermoplastic resin fibers, and to thereafter fuse or melt the resin fibers to thereby separate the articles. Joining yarns comprising thermoplastic fibers would have many advantages, if they could be removed from the structure in a satisfactory manner. In actual practice, however, it was found that yarns formed from thermoplastic resin fibers are only satisfactory for use as joining yarns under very special conditions. Thus, for example, if a yarn formed of ordinary fibers of a vinyl resin comprising a copolymer of vinyl chloride with vinyl acetate or with acrylonitrile is knitted into the continuous structure, and the structure is then heated to the melting point of the resin, the resin melts and collects between the stitches of the articles in the form of resin blobs which are fused to the stitches and which constitute a seemingly continuous hardened rim about the edges of the articles after their separation. These resin blobs cannot be removed from the article and their presence not only mars the appearance of the article but interferes seriously with the ravelling or looping operations to which many of the articles conventionally knitted in this manner are subjected during finishing.

I have found that all of the disadvantages attendant upon the use of yarns formed of ordinary fibers of the vinyl chloride copolymers aforementioned as joining yarns are avoided when the adjacent edges of the articles are joined together, during knitting of the string goods, with a yarn, and preferably a single course of a yarn, comprising thermoplastic fibers such as fibers of a copolymer of vinyl chloride with vinyl acetate or acrylonitrile which have been subjected to strong stretching either as a step in their production, or after their production and while the fibers are in at least partially plastic condition. During the stretching step, internal stresses and strains are set up in the molecular structure of the fibers as a result of which the fibers possess a high longitudinal shrinkage component and tend to undergo strong shrinkage under heating to temperatures at least as high as the melting point of the resin. When the joining yarns are formed from such stretched fibers which are in an unbalanced, internally strained condition at the time of their incorporation into the structure, and the fabricated structure is heated to the appropriate temperature, depending upon the melting point of the particular thermoplastic material from which fibers are formed, the fibers soften and may even fuse or melt, and contract strongly, as a result of which contraction, the stitches of the joining yarns pull away from the stitches of the knitted articles with which they are interlocked during the knitting operation. The tendency of the resin fibers to contract is opposed, however, by the restraining force of the adjacent stitches of the knitted articles, so that the resin fibers cannot fully expend their longitudinal shrinkage component. Under a light tension applied while the resin fibers are in the heat-softened condition, the resin fibers break and fall away from or "pop" out from between the stitches of the articles in the form of discrete resin particles, thereby disconnecting the articles. Clean separation of the articles is thus effected, and the edges of the separated articles are substantially entirely free of residual resin particles. It is particularly advantageous to join the adjacent edges of the articles by means of a single course of a yarn comprising stretched thermoplastic fibers of the type aforesaid. When such a single course of yarn is utilized, clean separation of the joined articles under a comparatively light tensioning force applied while the resin fibers are in the heat-softened condition is facilitated, and the possibility of even minute amounts of the resin remaining in contact with a few stitches of the articles is substantially completely eliminated. Any such minute residual amounts of resin at the edges of the articles are removed if the articles are subjected to ravelling or looping during finishing.

The percent stretch given the fibers to condition them for use for the present purposes may vary and will depend upon the material from which the resins are formed. In a preferred embodiment of the invention, the joining yarns comprise fibers of copolymers of vinyl halides and vinyl esters, notably copolymers of vinyl chloride and vinyl acetate, or copolymers of vinyl halides and acrylonitrile, which fibers have been subjected to a stretch of at least about 100% up to 1200% or more, and have a minimum shrinkage capacity of 50% under heating to temperatures at least as high as, or higher than, the melting temperature, but below the decomposition temperature, for the resin. Preferably, the copolymeric fibers, in situ in the fabricated continuous structure, are heated to a temperature of from about 200° F. to about 260° F., although somewhat higher or lower temperatures may be found satisfactory.

The joining yarns may be formed from highly stretched continuous filaments of a copolymer of vinyl chloride with vinyl acetate or with acrylonitrile or the like, or from discontinuous lengths cut from such filaments, and may consist wholly of the stretched copolymeric fibers or from mixtures of such fibers with fibers of other types which are also characterized by the capacity to undergo strong shrinkage on heating.

The joining yarn should be compatible, as to yarn count and denier, with the yarns comprising the knitted articles joined thereby, and with the machine on which the knitting is performed. For example, if the articles are knit from a 160 denier/112 multifilament yarn, a 160 denier/112 multifilament yarn is utilized as the joining yarn. The articles may be knit of yarns formed from fibers of any suitable type, but if the yarns are thermoplastic, they should be such as are not affected at the temperature employed to fuse the fibers of the joining yarn.

The invention may be practiced in connection with the knitting of all types of string goods, including hosiery, half-hosiery, ribbed tops, covers for various articles, including covers for rayon cakes or the like, sweaters, jacket, wristlets, lace webs or strips, etc.

In carrying out the invention, the articles are knitted on conventional knitting machines which are well known in the art and need not be described in detail here. The articles may be flat-knitted in the form of a continuous sheet or web, or they may be knitted on circular knitting machines in the form of a continuous tubular structure, the yarn formed from the highly stretched, heat-shrinkable copolymeric or similar fibers being fed to the machine after knitting of the first article of the series and the operations being repeated in sequence until the desired number of articles have been knitted.

In the drawing illustrative of the invention, there is shown a continuous tubular structure 2 which may proceed directly from a circular knitting machine and comprising a plurality of individual knitted articles 3, the adjacent edges of which are connected by a yarn comprising heat-shrinkable thermoplastic fibers, for example, a yarn formed from fibers of a copolymer of vinyl chloride and vinyl acetate characterized by a minimum residual shrinkage capacity of 50% resulting from stretching of the fibers by about 800% of their length while in the plastic condition. The structure is passed in compressed condition between a pair of electrically heated rollers 5 and 6 which contact all portions along the width of the structure. As the structure advances between rollers 5 and 6 it is heated to a temperature at least as high as the melting point of the resin. In the particular case illustrated, the structure was heated to a temperature of about 245° F. The structure comprising the heat-treated resin fibers is then immediately guided, by means of a guiding funnel 9, into the nip of the draw-off rollers 7 and 8, which may be of conventional type. The structure is thus heated and subjected to tension simultaneously. The resin fiber which is brought to a softened state by the heat-treatment, pulls away from the stitches of the articles by reason of its strong tendency to contract, and disintegrates readily into resin blobs under the tension to which the structure is subjected, and which "pop" out from between the stitches in the form of discrete particles. The separated articles are directed to a suitable receptacle, (not shown). Rollers 5 and 6 are spaced apart a predetermined distance and rotated at a speed relative to the speed of rollers 7 and 8 such that the fabricated structure passing therebetween and to the draw-off rollers is subjected to minimum drag, necessary to complete the separation of the string goods. The ease with which the joining yarn comprising the stretched resin fibers disintegrates after heating thereof to at least the melting point of the resin permits clean separation of the joined articles under a comparatively light tensioning force which does not affect the stitches of the articles themselves adversely.

Although the invention has been described more fully in connection with the use of a yarn comprising highly stretched, heat-shrinkable fibers of a copolymer of vinyl chloride with vinyl acetate or with acrylonitrile as the joining yarn, it will be readily understood that the joining yarn may be formed from or comprise other thermoplastic fibers which are capable of accepting a high stretch while in plastic condition by virtue of which the fibers have a minimum residual shrinkage capacity of 50% upon heating thereof to at least the melting point of the thermoplastic fiber-forming material.

Variations and modifications may be made carrying out the invention without departing from the spirit and scope of thereof as defined in the appended claims.

I claim:

1. Method which comprises producing a continuous structure composed of a plurality of knitted articles the adjacent edges of which are joined by a single course of a yarn formed from fibers of a copolymer of vinyl chloride and vinyl acetate which have been stretched by about 800%, said joining yarns having a yarn count and denier the same as the yarn count and denier of the yarns forming the joined articles, but having a lower fusing temperature than that of any thermoplastic yarns present in the knitted articles, and thereafter simultaneously subjecting the joining yarns to heat and applying tension to the structure to convert the highly stretched copolymer fibers to a softened condition in which they tend to contract strongly in opposition to the restraining force of the stitches of the joined articles and to effect disintegration of the joining yarns to discrete particle form, thereby disconnecting the articles.

2. Method of claim 1 wherein the joining yarns are heated to a temperature of about 245° F.

3. Method of claim 1 wherein yarn is removed from an end of the articles subsequently to their separation.

4. A continuous structure comprising a plurality of separable knitted articles the adjacent edges of which are joined together by a single course of a yarn comprising fibers of a copolymer of vinyl chloride and vinyl acetate which have been stretched about 800%, said joining yarns having a yarn count and denier the same as the yarn count and denier of the yarns forming the joined articles, but having a lower fusing temperature than that of any thermoplastic yarns present in the knitted articles.

WILLIAM P. CRAWLEY.

REFERENCES CITED

The following references are of record in the file of this patent:

UNITED STATES PATENTS

| Number | Name | Date |
| --- | --- | --- |
| 1,285,096 | Fisher | Nov. 19, 1918 |
| 1,758,665 | Hofner | May 13, 1930 |
| 2,262,861 | Rugeley et al. | Nov. 18, 1941 |
| 2,297,881 | Fuller | Oct. 6, 1942 |
| 2,314,618 | Green | Mar. 23, 1943 |
| 2,346,195 | Spalding | Apr. 11, 1944 |
| 2,420,565 | Rugeley et al. | May 13, 1947 |
| 2,437,735 | Getaz | Mar. 16, 1948 |